(No Model.)

C. T. HIGGINBOTHAM.
CYCLOMETER.

No. 584,286. Patented June 8, 1897.

Witnesses:
M. A. Weinstein
Henry T. Kirsch.

Inventor
Charles T. Higginbotham
By Thomas Drew Stetson
Attorney

UNITED STATES PATENT OFFICE.

CHARLES T. HIGGINBOTHAM, OF THOMASTON, CONNECTICUT, ASSIGNOR TO THE SETH THOMAS CLOCK COMPANY, OF SAME PLACE.

CYCLOMETER.

SPECIFICATION forming part of Letters Patent No. 584,286, dated June 8, 1897.

Application filed October 4, 1895. Renewed April 16, 1897. Serial No. 632,492. (No model.)

*To all whom it may concern:*

Be it known that I, CHARLES T. HIGGINBOTHAM, of Thomaston, Litchfield county, in the State of Connecticut, have invented a certain new and useful Improvement in Cyclometers, of which the following is a specification.

My cyclometer is adapted to apply on bicycles and analogous carriages, and to indicate distinctly to the eye the number of miles and certain fractions or portions of a mile which have been traversed. It is peculiarly simple in construction and possesses the quality of being entirely unaffected by any backward turning of the wheel through chance or design. The mechanism is operated by a pawl so conditioned that the reversion of the movement lifts it out of engagement and it plays idly so long as the wheels of the bicycle or other carriage are turned backward. This is particularly important as giving a reliable indication of the forward rotations of the wheels absolutely unaffected by any reverse movement or other manipulation.

The amount of mechanism required to reduce the speed in giving motion to the revolving ring is much less than in ordinary cyclometers.

The accompanying drawings form a part of this specification and represent what I consider the best means of carrying out the invention.

Figure 1:
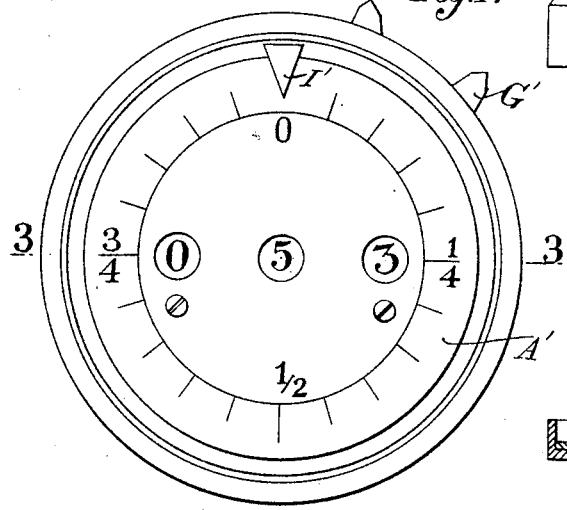
Figure 2:
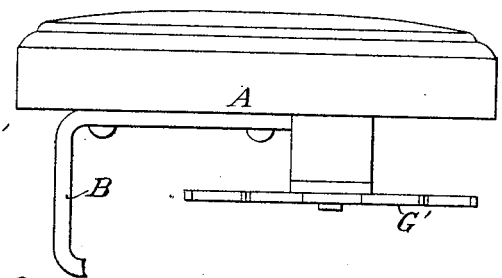
Figure 3:
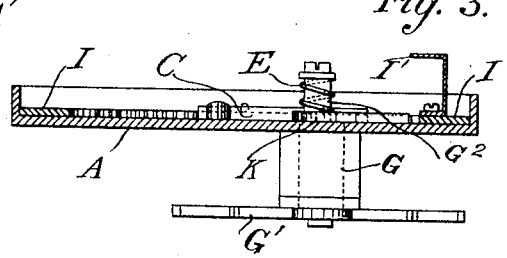
Figure 4:
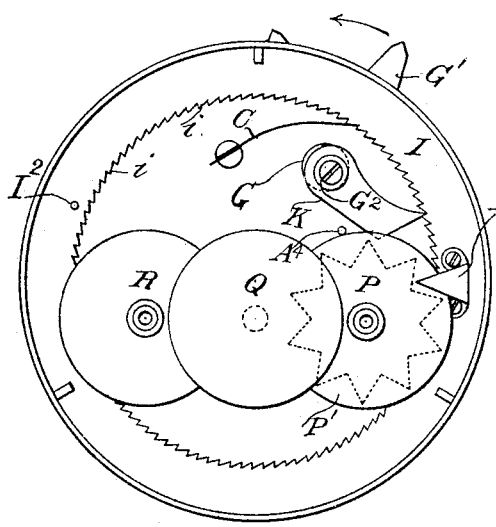
Figure 5:
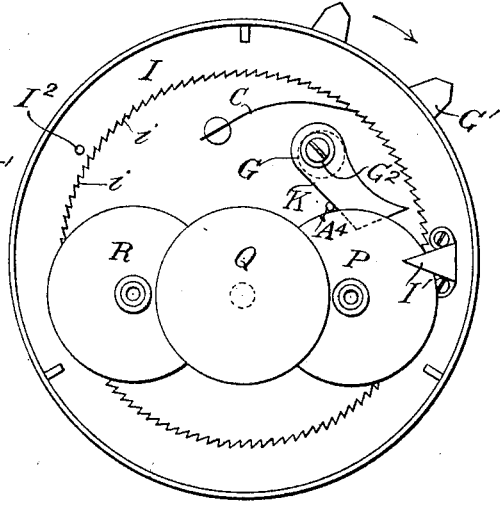

Figure 1 is a face view of the instrument entire, and Fig. 2 is an edge view. Fig. 3 is a section on the line 3 3 in Fig. 1. Fig. 4 is a face view with the dials removed. All these figures show the parts in the relations which obtain when the bicycle is going ahead. Thus conditioned the instrument registers. Fig. 5 is a view similar to Fig. 4, except that the parts are shown in the condition they assume when the wheel is turned backward. Under these conditions the instrument does not register, neither does it abstract from the previous registration, but remains unaffected by any amount of backward turning.

Similar letters of reference indicate corresponding parts in all the figures where they appear.

A is the case or body of the cyclometer, certain portions being designated, when necessary, by supernumerals.

B is the support, by which, with the aid of a bridge-piece and suitable screws, it is supported and adjusted as required upon the frame of the bicycle. (Not shown.)

A' is the large or main dial, provided with graduations to indicate the fractions of a mile by the traversing of an index I', carried on a ring I, inclosed in the space under the main dial and adapted to be moved around by a gentle force.

G is the shaft, through which the motion is received from the outside and communicated to the interior of the cyclometer. It carries on its outer end a long-toothed or winged wheel G' and on its inner end an eccentric $G^2$ of small throw.

I provide the inner surface of the ring I with a series of fine teeth $i$, adapted to receive the action of a corresponding chisel-ended pawl K, hung on the eccentric pin or crank $G^2$ and receiving a sufficient motion from the revolution of the latter. An ordinary projection (not shown) carried on the front wheel of the bicycle acts in the ordinary and well-known manner on the long toothed or winged wheel G' and gives at each revolution of the front wheel a small portion of a revolution to the wheel G' and consequently to the shaft G and eccentric $G^2$. When the proper number of revolutions of the bicycle-wheel have induced a complete revolution of the shaft G, the pawl K will have made one reciprocation, and its free end, having engaged one of the teeth $i$, will have partially rotated the ring I, and a holding-pawl C will hold the ring firmly advanced that small increment. The withdrawing movement of the operating-pawl K will cause it to snap over the next tooth $i$, and on the next revolution of the crank or eccentric pin $G^2$ it will again move forward the ring I to the small extent of the space between one tooth $i$ and the next. Thus as the bicycle is traversed forward the ring I is moved around by small and relatively rapidly-succeeding steps. This ring carries a pin $I^2$ on its front face, which performs important functions.

The main dial A' is provided, as usual in this class of instruments, with three perforations, through which are presented the several figures carried on three small dials P, Q, and R, the dial P indicating the units, the dial Q the tens, and the dial R the hundreds of miles.

The pin I² set in the front face of the ring I near the inner edge, is adapted to engage with the toothed wheel P' on the back face of the dial P (shown in dotted lines in Fig. 4) and to induce a forward movement of the dial at the proper time. This is a form of an invention usually attributed to Pascal, of France, many years ago, sometimes designated as the "Geneva" motion, whereby the revolution of a driving-wheel produces no effect upon the driven wheel except during a brief portion of each revolution; but during such short period it moves the other wheel smartly a small step. The gearing of the several dials P Q R together is of the ordinary well-known form of the Geneva motion. Each complete revolution of the dial P, which indicates units, gives at the right period by a single tooth a tenth of a revolution to the dial Q, which indicates tens, and each complete revolution of the dial Q gives at the right period by a single tooth a tenth of a revolution to the wheel R, which indicates hundreds.

The crank-pin or eccentric-pin G² is preferably longer than the thickness of the adjacent portion of the pawl K and accommodates a spiral spring E, which maintains a friction between the head of the pin G² and the pawl, so that there is a gentle force, due to such friction, received from the rotation of the shaft G, urging the sharp end of the pawl into engagement with the teeth $i$ so long as the motion of the bicycle is forward; but when through any chance the bicycle is turned backward, or when, as may occur in some instances, the bicycle is lifted from the ground and the wheel is turned actively backward with a view to fraudulently induce a change in the indications of the cyclometer, the friction of this spring E moves the pawl K out of engagement with the teeth $i$ and holds it pressed gently against a stop-pin A⁴, in which position it reciprocates idly. It follows that no amount of turning the bicycle-wheel backward can be made available to effect the indications of the cyclometer.

Modifications may be made in the details without departing from the principle or sacrificing the advantages of the invention.

I can use a rigid pawl actuated by a gentle spring in place of the spring-pawl C to hold the ring I reliably as it is turned to the required small extent by the working pawl K.

I claim as my invention—

1. In a cyclometer, an inclosing case, a dial and an index, in combination with operating mechanism for the latter receiving motion from the wheel of the carriage through an eccentric G², with a proper holding-pawl, and gear for reducing the motion, and means as the spring E for inducing friction between the eccentric and the operating-pawl, substantially as shown, so that when the eccentric is turned by the carriage moving forward it will induce the engagement of the pawl to properly operate the index, and also will in case of any reverse motion of the eccentric, be held out of engagement and of no effect, substantially as herein specified.

2. In a cyclometer, in combination with a suitable case and series of dials, and a suitable provision as a long-toothed wheel for receiving the motion from a wheel of the carriage, a ring I finely toothed and adapted to be revolved and an eccentric and pawl arranged to give a slight forward motion thereto, means as a holding-pawl for preventing a return motion, and means as the spring E for inducing friction on the eccentric-pawl, arranged substantially as shown, so that the friction causes the pawl to be held out of engagement so as to be of no effect when such wheel is turned backward, all substantially as herein specified.

3. In a cyclometer for bicycles and other vehicles, a driving means comprising a rotatable shaft carrying at one end a winged wheel adapted to receive a partial revolution at each complete revolution of the wheel of the bicycle, a pawl pivotally carried at the inner end of said shaft and eccentric to the axis of rotation thereof and operatively engaging and driving a train of mechanism when the shaft is rotating in one direction, and so assembled as to move the pawl out of operative engagement when the said shaft is rotating in the reverse direction, fraction indications or numerals carried by some of the moving parts of the train mechanism with a suitable casing through which one of the numerals on each of the numeral-bearing members of the train mechanism is visible.

4. In a cyclometer, an inclosing case indicating members in combination with operating mechanism for the latter, said operating mechanism receiving motion from the wheel of the carriage through the eccentric G², with a proper pawl, said pawl being frictionally carried upon said eccentric-crank, so that when the eccentric is turned by the carriage moving forward, it will induce engagement of the pawl to properly operate the train of indicating mechanism, and also will, in case of any reverse move of the eccentric, be held out of engagement and of no effect.

5. In a cyclometer, a case, containing indicating members in combination with operating mechanism for the latter, said operating mechanism receiving motion from the wheel of the carriage through a shaft carrying a wing-wheel toward its outer or free end, adapted to receive partial rotation at each complete rotation of the bicycle-wheel, with a pawl frictionally carried on an eccentric-crank and driven by said shaft, so that when said eccentric-crank is turned by the shaft in one direction it will induce movement in the pawl to properly engage with the train of indicating mechanism, and will also in the case of reverse movement of said shaft, be held out of operative engagement therewith.

In testimony that I claim the invention above set forth I affix my signature in presence of two witnesses.

CHAS. T. HIGGINBOTHAM.

Witnesses:
W. T. WOODRUFF,
F. I. ROBERTS.